: 2,967,184
Patented Jan. 3, 1961

2,967,184

DIPHTHALIDES

Donald D. Wheeler and David C. Young, Midland, Mich., assignors to The Dow Chemical Company, Midland, Mich., a corporation of Delaware No Drawing. Filed Feb. 6, 1959, Ser. No. 791,545

4 Claims. (Cl. 260—343.3)

This invention is concerned with diphthalides having the formula

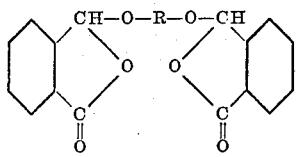

In this and succeeding formulae, R represents a carbon chain containing 2 carbon atoms and substituted on one carbon in the chain a radical selected from the group alkoxymethyl, phenoxymethyl, alkenyloxymethyl and halomethyl. These new compounds are amber colored oils or light colored solids and are somewhat soluble in many organic solvents such as benzene, toluene and acetone and substantially insoluble in water. They have utility as parasiticides for the control of bacterial and fungal organisms. Certain of these may be employed as herbicides for the control of plant growth.

These novel compounds may be prepared by causing phthalaldehydic acid to react with an appropriate dihydroxy compound having the formula

HO—R—OH to produce the desired diphthalide and water of reaction. The terms "phthalaldehyde acid" and "3-hydroxyphthalide" refer to a compound having the structure

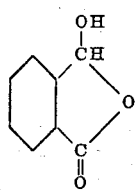

Phthalaldehydic acid is often represented in the literature as having the structure

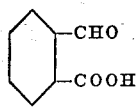

However, the acid employed in this invention and prepared as hereinafter described exists almost entirely in the closed ring 3-hydroxyphthalide structure as observed from a study of its infrared absorption spectrum. Infrared data also indicate the diphthalide product to have a closed ring 3-hydroxyphthalide structure with the open chain ester sometimes being formed as a by-product.

In the synthesis, good results are obtained when substantially two molar proportions of phthalaldehydic acid are employed for each molar proportion of dihydroxy compound. The relative amounts of the reactants are not critical in the formation of the desired product. However, phthalaldehydic acid, if used in large excess or under conditions of high temperature, may form an anhydride by-product. The reaction takes place smoothly in the temperature range of from 15° to 150° C. but a range of from 90° to 130° C. is considered preferable from a practical standpoint, such as rate of reaction or convenience of operation. Solvents such as benzene and toluene may be employed as reaction medium, if desired. The product obtained may be separated from the water of reaction by vaporization of the latter.

In one mode of carrying out the reaction, phthalaldehydic acid and the dihydroxy compound are mixed and heated in the preferred temperature range of from 0.5 to 3 hours. At the end of this period, the pressure on the system is reduced to about 15 millimeters and the mixture heated to 150° C. to distill the water of reaction and low boiling material and to obtain the desired 3-hydroxyphthalide product as residue.

The following examples illustrate the invention but are not to be construed as limiting.

*Example 1.—3,3' - (3 - chloro - 1,2 - propylenedioxy)diphthalide*

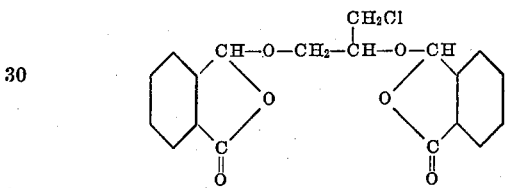

32.0 grams (0.29 mole) of 3-chloro-1,2-propanediol and 87.0 grams (0.58 mole) of phthalaldehydic acid were mixed and heated at 120° C. for three hours. The pressure on the system was reduced to about 15 millimeters and the mixture heated to distill the water. The temperature was then increased to 130° C. to remove low boiling material by distillation and to obtain as residue a 3,3'-(3-chloro-1,2-propylenedioxy)diphthalide product in a yield of 105 grams or 95.5 percent of theoretical. The latter was a viscous oil having a refractive index $n_D^{60}$ of 1.5552.

*Example 2.—3,3' - (3 - phenoxy - 1,2 - propylenedioxy) diphthalide*

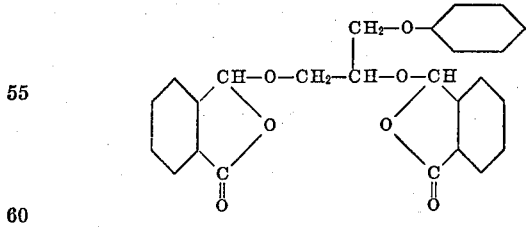

42.0 grams (0.25 mole) of 3-phenoxy-1,2-propanediol and 75.0 grams (0.50 mole) of phthalaldehydic acid were mixed and heated at 125° C. for three hours. The pressure on the system was reduced to about 15 millimeters and the mixture heated to distill the watetr. The temperature was then increased to 130° C. to remove low boiling material by distillation and to obtain as residue a 3,3'-(3-phenoxy-1,2-propylenedioxy)diphthalide product in a yield of 98 grams or 92 percent of theoretical. The latter was a viscous oil having a refractive index $n_D^{60}$ of 1.5669.

*Example 3.—3,3' - (3 - allyloxy - 1,2 - propylenedioxy) diphthalide*

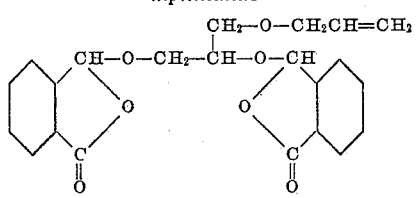

32.0 grams (0.25 mole) of 3-allyloxy-1,2-propanediol and 75.0 grams (0.50 mole) of phthalaldehydic acid were mixed and heated at 120° C. under reflux for three hours. The pressure was then reduced to about 15 millimeters and the mixture heated to distill the water. The temperature was then increased to 130° C. to remove low boiling material by distillation and to obtain as residue a 3,3'-(3-allyloxy-1,2-propylenedioxy)diphthalide product in a yield of 98 grams or 100 percent of theoretical. The latter was a viscous oil having a refractive index $n_D^{20}$ of 1.5512.

*Example 4.—3,3' - (3 - ethoxy - 1,2 - propylenedioxy) diphthalide*

30.0 grams (0.25 mole) of 3-ethoxy-1,2-propanediol and 75.0 grams (0.50 mole) of phthalaldehydic acid are mixed and heated at 130° C. for three hours. The pressure is then reduced to about 20 millimeters and the mixture heated to distill the water. The temperature is then increased to 150° C. to distill off low boiling material and to obtain as residue a 3,3'-(3-ethoxy-1,2-propylenedioxy)diphthalide product having a molecular weight of 384.4.

*Example 5*

77.5 grams (0.50 mole) of 3-bromo-1,2-propanediol and 150 grams (1.0 mole) of phthalaldehydic acid are mixed and heated at 110° C. for 2.5 hours. The pressure is then reduced to about 20 millimeters and the mixture heated to distill the water. The temperature is then increased to 150° C. to distill low boiling material and to obtain as residue a 3,3'-(3-bromo-1,2-propylenedioxy)-diphthalide product having a molecular weight of 419.23.

In similar preparations, diphthalides may be prepared as follows:

3,3'-(3-butoxy-1,2-propylenedioxy)diphthalide by the reaction of 3-butoxy-1,2-propanediol with phthalaldehydic acid.

3,3' - (3 - crotyloxy-1,2-propylenedioxy)diphthalide by the reaction of 3-crotyloxy-1,2-propanediol with phthalaldehydic acid.

3,3'-(3-methoxy-1,2-propylenedioxy)diphthalide by the reaction of 3-methoxy-1,2-propanediol with phthalaldehydic acid.

The products of this invention having the structure

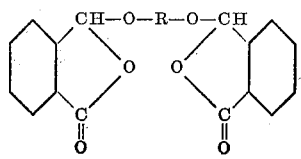

are effective as germicides and may be employed for the control of bacterial and fungal organisms, such as *Staphylococcus aureus, Salmonella typhosa, Erwinia carotovora* and *Penicillium digitatum*. In a representative example, 3,3'-(3-allyloxy-1,2-propylenedioxy)diphthalide was added to bacteriological medium to give a concentration of 0.05 percent and the medium inoculated with *Staphylococcus aureus* and incubated at 30° C. for four days. At the end of this period, complete inhibition of growth of the test organism was observed.

In another representative operation for the control of bacteria, 3,3' - (3-chloro-1,2-propylenedioxy)diphthalide was added to nutrient agar medium to provide a concentration of 0.25 percent by weight of the phthalide compound. Separate portions of the modified nutrient agar medium were inoculated with *Staphylococcus aureus, Salmonella typhosa* and *Erwinia carotovora* and incubated at 30° C. for three days. At the end of this period, complete inhibition of growth of the test organisms were observed.

In a representative operation for the control of fungi, 3,3'-(3-chloro-1,2-propylenedioxy)diphthalide was added to yeast agar medium to produce a culturing medium containing 0.25 percent by weight of 3,3'-(3-chloro-1,2-propylenedioxy)diphthalide. The resulting medium was inoculated with *Penicillium digitatum* and incubated at 30° C. for 3 days. At the end of this period, complete inhibition of the growth of the test organism was observed.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with an aqueous solution containing from 4 to 35 percent by weight of a metal halide such as ferric chloride to obtain phthalaldehydic acid as more fully disclosed and claimed in a copending application of James D. Head and Owen D. Ivins, Serial Number 279,682, filed March 31, 1952, now Patent Number 2,748,162.

This is a continuation-in-part of our copending application Serial No. 581,288, filed April 30, 1956, now abandoned.

We claim:

1. A 3-hydroxyphthalide derivative having the formula

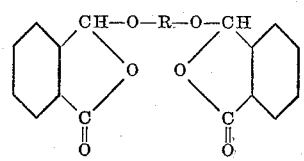

wherein R represents a substituted ethylene radical wherein the substituent is selected from the group consisting of lower alkoxymethyl, phenoxymethyl, lower alkenyloxymethyl and halomethyl.

2. 3,3'-(3-chloro-1,2-propylenedioxy)diphthalide.
3. 3,3'-(3-phenoxy-1,2-propylenedioxy)diphthalide.
4. 3,3'-(3-allyloxy-1,2-propylenedioxy)diphthalide.

No references cited.